United States Patent

Maeguchi et al.

Patent Number: 5,707,310
Date of Patent: Jan. 13, 1998

[54] INTERNAL PLANETARY GEAR DEVICE

[75] Inventors: Yuji Maeguchi; Hideaki Harada, both of Ohbu, Japan

[73] Assignee: Sumitomo Heavy Industries, Ltd., Tokyo, Japan

[21] Appl. No.: 398,673

[22] Filed: Mar. 6, 1995

[30] Foreign Application Priority Data

Mar. 8, 1994 [JP] Japan .................. 6-036796

[51] Int. Cl.$^6$ ............................................. F16H 1/32
[52] U.S. Cl. .................... 475/180; 475/162; 475/168
[58] Field of Search ............................. 475/162, 168, 475/178, 180, 179

[56] References Cited

U.S. PATENT DOCUMENTS

| | | | |
|---|---|---|---|
| 3,877,442 | 4/1975 | Miller, Jr. | 123/8.45 |
| 4,031,781 | 6/1977 | Iida et al. | 475/180 |
| 4,050,331 | 9/1977 | Braren | 475/168 |
| 4,643,047 | 2/1987 | Distin et al. | 475/168 |
| 4,673,342 | 6/1987 | Saegusa | 475/180 X |
| 4,715,243 | 12/1987 | Morishita et al. | 74/434 |
| 4,760,759 | 8/1988 | Blake | 475/180 X |
| 4,909,102 | 3/1990 | Haga | 475/168 |
| 4,922,781 | 5/1990 | Peiji | 475/180 X |
| 5,123,883 | 6/1992 | Fukaya | 475/178 |
| 5,267,918 | 12/1993 | Shiroyama | 475/331 |
| 5,292,289 | 3/1994 | Ogata et al. | 475/176 |
| 5,429,556 | 7/1995 | Ishida et al. | 475/180 |
| 5,458,023 | 10/1995 | Ishikawa et al. | 74/640 |

*Primary Examiner*—Charles A. Marmor
*Assistant Examiner*—Peter T. Kwon
*Attorney, Agent, or Firm*—Nikaido, Marmelstein, Murray & Oram LLP

[57] ABSTRACT

An internal planetary gear device having an input shaft, an eccentric body rotating with the rotation of the input shaft, an external gear eccentrically rotatably mounted on the eccentric body through a bearing, an internal gear internally meshing with the external gear, and an output shaft connected to the external gear through a device for taking up only components of rotation of the external gear, wherein, each component is manufactured of resin, and one of the internal teeth of the internal gear and the external teeth of the external gear is formed into a tooth profile including an inner envelope configuration of curtate epitrochoid theoretical curve C, while the other, into a convex circular tooth profile.

4 Claims, 7 Drawing Sheets

LEGEND a : PROLATE EPITROCHOID b : EPICYCLOID c : CURTATE EPITROCHOID a' : PROLATE HYPOTROCHOID b' : HYPOCYCLOID c' : CURTATE HYPOTROCHOID

LEGEND a : PROLATE EPITROCHOID b : EPICYCLOID c : CURTATE EPITROCHOID a' : PROLATE HYPOTROCHOID b' : HYPOCYCLOID c' : CURTATE HYPOTROCHOID

CONCAVE CIRCULAR
TOOTH PROFILE

INTERNAL PLANETARY GEAR DEVICE

BACKGROUND OF THE INVENTION

1. Field of the Invention

The present invention relates to an internal planetary gear device suitable for use in a miniature reduction gear or overdrive gear and, more particularly, in a miniature reduction gear made of plastic or overdrive gear.

2. Description of the Prior Art

As an example of a prior internal planetary gear device, there has been widely known an internal planetary gear device comprising a first shaft, an eccentric body which is rotated by the rotation of the first shaft, an external gear mounted on the eccentric body through a bearing to enable eccentric rotation, an internal gear in internal mesh with the external gear, and a second shaft coupled with the external gear through a kind of device for taking up only a rotational component of the external gear.

An example of this prior art gear device is shown in FIGS. 7 and 8. In this example the above-described system is applied to a "reduction gear" by using the first shaft as an input shaft and the second shaft as an output shaft, and by fixedly mounting an internal gear.

Eccentric bodies 3a and 3b are fitted on the input shaft 1 with a specific phase difference (180 degrees in this example). These eccentric bodies 3a and 3b are offset by the amount of eccentricity $e$ (the center O2) in relation to the input shaft 1 (the center O1). Two external gears 5a and 5b in double rows are freely fitted around the eccentric bodies 3a and 3b through eccentric bearings 4a and 4b. The external gears 5a and 5b are provided with a plural of inner roller holes 6a and 6b, in which internal pins 7 and inner rollers 8 are loosely fitted respectively.

The use of the two (double rows of) external gears is mainly for the purpose of increasing the transmission capacity, maintaining strength, and holding rotational balance.

The external gears 5a and 5b have external teeth 9 of trochoidal tooth profile (prolate epitrochoid curve tooth profile) on the outer periphery thereof. The external teeth 9 internally mesh with circular pins 13 (convex circular tooth profile), which correspond to internal teeth, of an internal gear 10 fixedly mounted in a casing 12.

The internal pins 7 which are loosely inserted in the external gears 5a and 5b are securely mounted or fitted in a flange portion of an output shaft 2.

The eccentric bodies 3a and 3b make one rotation by one rotation of the input shaft 1. With the one rotation of these eccentric bodies 3a and 3b, the external gears 5a and 5b tend to rockingly rotate around the input shaft 1. However, being restrained from rotation by the internal gear 10, the external gears 5a and 5b make almost a rocking motion while internally meshing with the internal gear 10.

Now, for example, let $n$ be the number of teeth of the external gears 5a and 5b (n=21 in the illustrated example) and $n+b$ 1 be the number of teeth of the internal gear 10, then a difference $N$ of the number of teeth between these gears is 1. Therefore, the external gears 5a and 5b are shifted (rotated) by one tooth with respect to the internal gear 10 fixedly mounted in the casing 12. This means that one rotation of the input shaft 1 is reduced by a $-1/n$ rotation of the external gears 5a and 5b.

Rocking components of the external gears 5a and 5b are absorbed by a clearance between the internal rollers 6a and 6b and the internal pins (internal rollers 8), so that only rotational components may be transmitted to the output shaft 2 through the internal pins 7.

Consequently, gear reduction of a reduction ratio $-1/n$ can be accomplished.

The internal planetary gear device has been applied to various types of reduction gears or overdrive gears. For example, in the gear device stated above, the first shaft is an input shaft, while the second shaft is an output shaft, and the internal gear is mounted as a stationary gear. However, it is possible to utilize the first shaft for the input shaft, the internal gear for an output shaft, and the second shaft for the stationary gear, to thereby constitute a reduction gear unit. Furthermore, the overdrive gear unit may be formed by reversing the rotation of the input and output shafts.

The prior internal planetary gear device has been used in a field where a comparatively great power is handled, accordingly, it is required to use a metallic material for the gear devices, and a reduction gear using the gear device becomes fairly heavy.

However, noticing the feature that in the internal planetary gear device enables a high ratio reduction by a single reduction stage, there has recently become popular to apply the gear device to a field where a less power is handled (for example in a drive system of an office automation equipment).

In such a field where a light power is handled, particularly weight and cost reduction of the gear device are important problems to be solved and accordingly there has been a growing demand for using a resin, not a metal, as a material of the reduction gear in which the internal planetary gear device is adopted.

This type of reduction gear produced of a resin, however, has such an actual problem, that is, of course material strength of metallic device is stronger than that of resin device. However, a life of metallic device is much longer than that of resin device. Also, of course static dimension or static assembling dimension of metallic device (component) is more accurate than that of resin device. However, a rotational deviation of metallic device is quite smaller than that of resin device.

Namely, a difference in life between resin device and metallic device is larger than a difference in inherent own material strength between resin and metal, and, a difference in rotational deviation between resin device and metallic device is also larger than a difference in static own dimensional accuracy or own assembling accuracy of each component. Furthermore the resin device has such a problem that noise and vibration of operation are likely to grow larger.

SUMMARY OF THE INVENTION

In view of the above-described problems inherent in the heretofore known art, the inventor et al. have researched why the difference in the life or the rotational deviation between resin device and metallic device is larger than the difference in inherent strength or static dimensional accuracy. And finding a reason, it is an object of the present invention to provide an internal planetary gear device produced of a resin which is designed to prevent the occurrence of above problems.

The present invention has solved the above problems by such structure, that is, in an internal planetary gear device, which comprises a first shaft, an eccentric body mounted on said first shaft, an external gear eccentrically and rotatably mounted through the eccentric body, an internal gear internally meshing with said external gear, means for taking up only components of rotation of said external gear, and a second shaft connected to the external gear through the means for transmitting only components of rotation of the external gear; wherein said gear device is made of resin, and either one of said internal gear and said external gear is formed with a convex circular tooth profile, while the other is formed with a tooth profile including an inner envelope configuration of a curtate epitrochoid theoretical curve.

With respect to the internal and external gears, at least one gear having a tooth profile including of an inner envelope profile of a curtate epitrochoid theoretical curve is desired to be made by an injection molding process together with a tooth profile. Once the die of the theoretical curve is prepared, a gear having any complicated theoretical tooth profile can be manufactured at the same cost, thereby enabling to reduce the cost per gear by increasing the quantity of gears to be manufactured.

As described above, the inventor et al. have conducted researches and investigations on why the difference in the life or the rotational deviation between resin device and metallic device is larger than the difference in inherent strength or static dimensional accuracy, consequently ascertaining from a result of these researches and investigations that the above-described differences are caused mainly by an error (an error in a radial direction) in the amount of dynamic eccentricity arising from actual operation of assembled members.

This conception, however, has not at all been paid attention.

Because, the cause of the above-described problems is not static as the dimensional accuracy of each of parts or the assembling accuracy of the parts in the process of manufacture or installation. Accordingly, it can not be found by measurements or inspections to be conducted when the equipment is not operating. Furthermore, in the field of prior metallic reduction gears, there hardly exists a dynamic error of the amount of eccentricity likely to arise during operation. This is a reason why the conception has not at all been paid attention.

In the present invention, since it has been considered inevitable that, in a plastics reduction gear, there occurs a dynamic error in a radial direction, one of the internal gear and external gear is formed into a convex circular tooth profile, while the other is formed into a tooth profile including an inner envelope of the curtate epitrochoid theoretical curve. As a result, even if the dynamic error in a radial direction occurs, it becomes practicable to decrease a deviation from theoretical engagement resulting from the dynamic errors of the both, and besides it becomes possible to prevent bad influence of the dynamic errors in the radial direction from appearing compared to a prior prolate epitrochoid tooth profile, thereby enabling to accomplish further prolonging of life, decrease in rotational uniformity, and reduction of noise.

As a tooth profile apparently similar to the tooth profile of the present invention, there has been disclosed in Catalog No. 71320E of Shimpo Kogyo Co., Ltd. the gear device produced of a metallic material that convex circular teeth thereof are in internal contact with concave circular teeth as shown in FIG. 11.

According to the catalog, the tooth profile is designed to obtain a greater contact surface pressure during engagement to thereby enable to decrease the surface pressure (a contact pressure per unit area) by using the internal contact structure that a "circle" is enclosed with a "circle," and also to ensure little abrasion. Furthermore the catalog tells that a gear manufactured with a high tooth accuracy sufficiently close to "roundness" in microns can reduce noise, vibration and overheat.

This tooth profile, being certainly apparently similar in the external tooth profile of the present invention, can not be esteemed as a prior art pertaining to the disclosure of the technical idea of the present invention because of following three reasons. That is, firstly because a convex circular tooth profile internally contacts a concave circular tooth profile (either tooth profile is circular), secondly because the catalog tells it is significant that two circles are formed sufficiently close to "roundness" through extremely high-accuracy working, and thirdly because this (prior) tooth profile is used in a metallic reduction gear, and has no relation to an environment that the conception for obviating the aforesaid disadvantage, namely "the disadvantage of a plastics gear device resulting from a dynamic error in the radial direction". In effect, this catalog states nothing about the conception described above.

According to the internal planetary gear device having the tooth profile pertaining to the present invention, as heretofore described, the plastics gear can gain the following advantages such as higher durability and less rotational uniformity, vibration and noise of operation as compared with the prior internal planetary gear device pertaining to a combination of the prolate epitrochoid and convex circular tooth profiles. Furthermore, the gear device of the present invention also acquires a good result such as greater durability, less rotational uniformity, and operational noise and vibration due to little deviation from theoretical engagement in relation to the error, as compared with he internal planetary gear device pertaining to the combination of the concave and convex circular tooth profiles.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENT

An embodiment of an internal planetary gear device of the present invention will be explained in detail with reference to the drawings.

Figure 7:
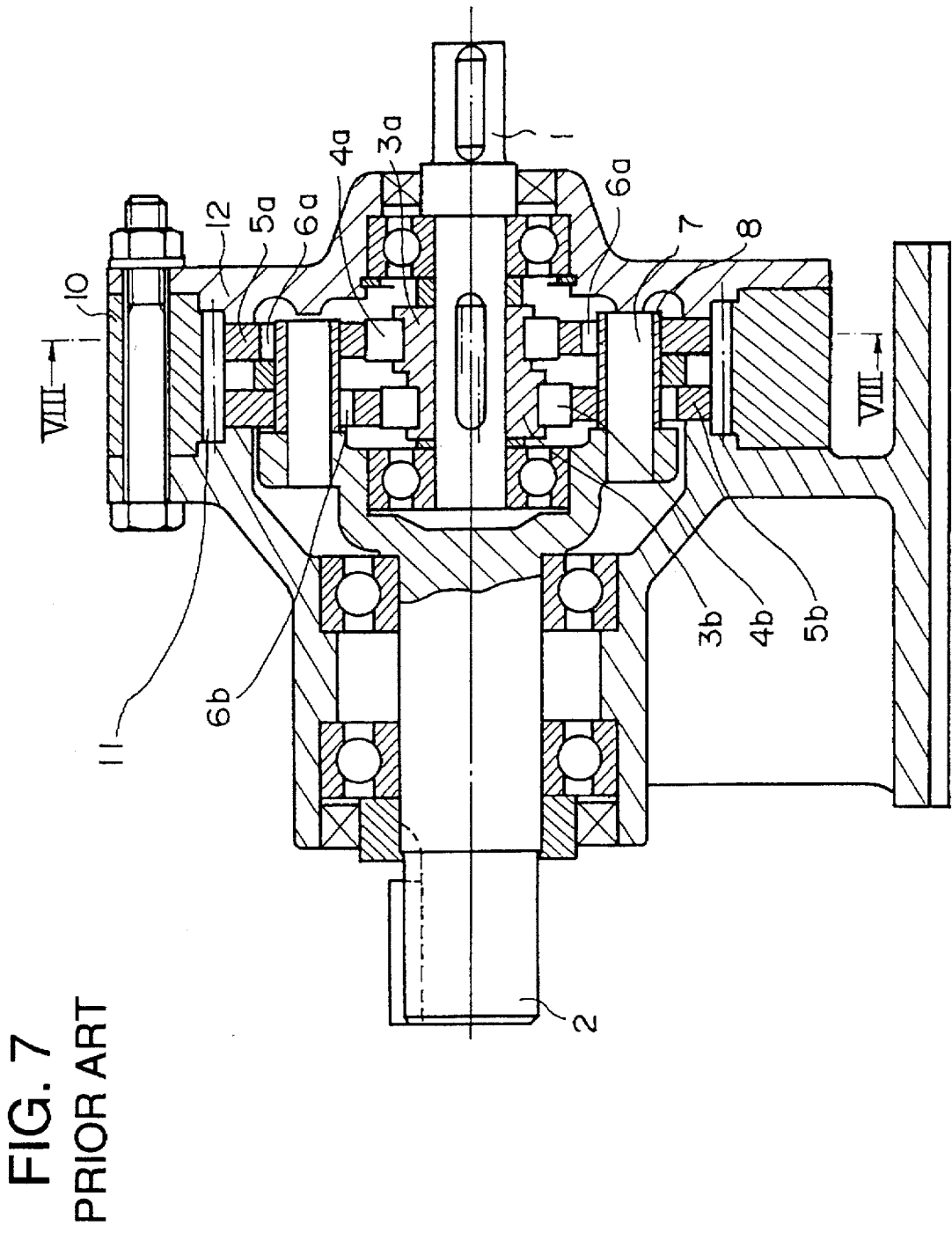
FIG. 7 is a sectional view showing a prior internal planetary gear device pertaining to engagement between the prolate epitrochoid tooth profile and the convex circular tooth profile.
Figure 8:
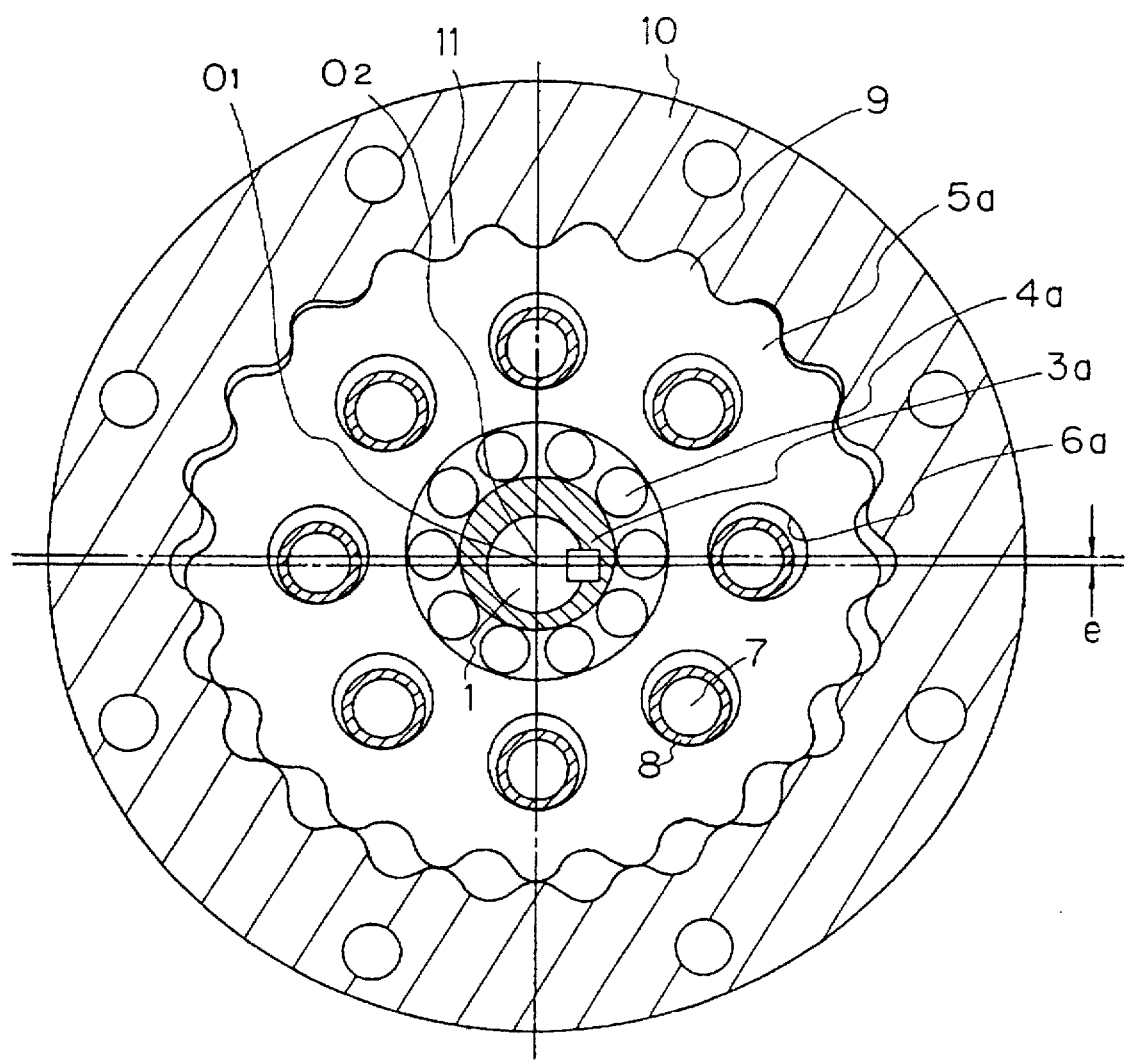
FIG. 8 is a sectional view taken along a line VIII—VIII indicated by an arrow in FIG. 7.

In the present embodiment, the gear device only differs from a prior art example in the tooth profiles of external teeth of an external gear and internal teeth of an internal gear, while the other has a constitution identical to that shown in FIGS. 7 and 8. Therefore, the tooth profiles of the internal and external gear teeth will mainly be explained below and others will not be described.

The tooth profile of an external gear used in this type of internal planetary gear device can be introduced through a theory of perfect engagement when the tooth profile of the external gear is drawn basically with a parallel curve (equidistant in a normal direction) of a trochoid curve, while the tooth profile of the meshing gear is a convex circular tooth profile.

Figure 1:
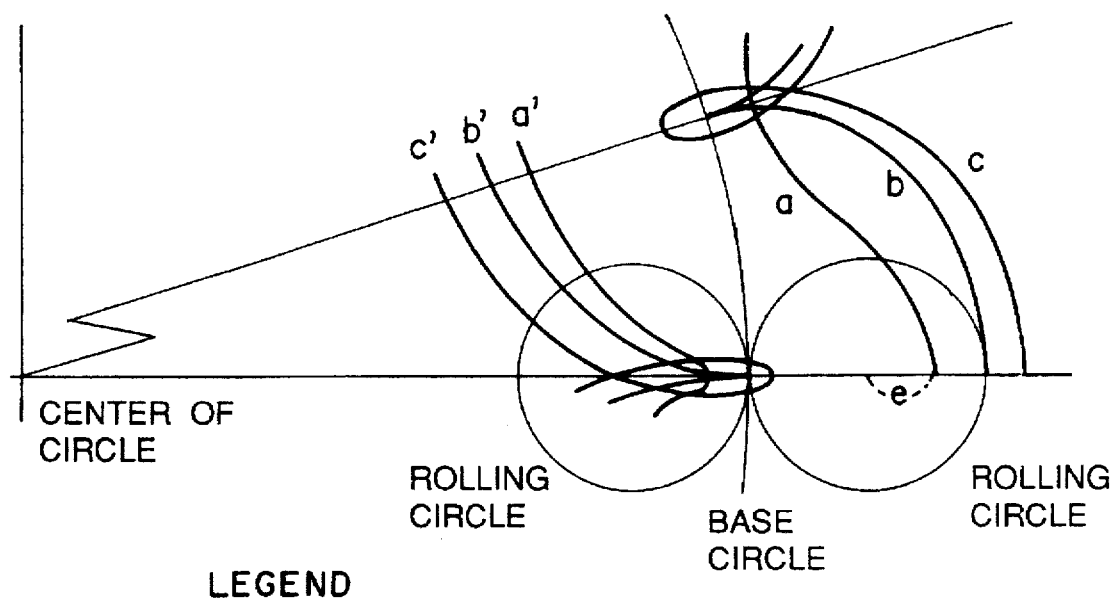
FIG. 1 is a diagram for explaining various trochoid curves.

The trochoid curve in a broad sense is a locus drawn by one point on a rolling circle or on its extension, as indicated by a to c and a' to c' in FIG. 1, when the rolling circle rolls around the base circle without slipping; the curve having the rolling circle rolling inside of the base circle (a', c') is called hypotrochoid, while the curve having the rolling circle rolling outside of the base circle (a, c), is called epitrochoid. For the tooth profile of the external gear of the internal planetary gear device, a prolate epitrochoid inner parallel curve (a in FIG. 1) has been used as described above.

The epitrochoid curve in a wide sense may be classified into three kinds (a, b and c) as previously stated depending on the positions of points on a rolling circle drawing a curve. When the external gear is cut using these three kinds of trochoid parallel curves taking workability into consideration, the hatched part shown in FIGS. 2 to 4 can become the tooth profile of the external gear.

Figure 2:
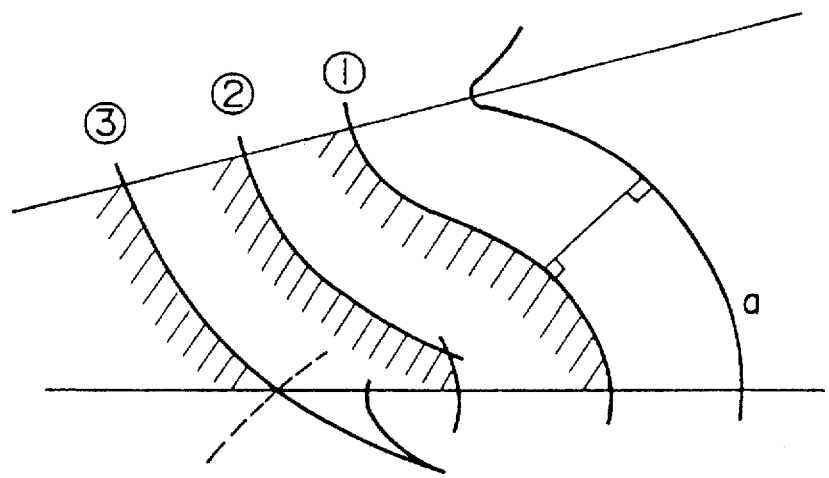
FIG. 2 is a diagram for explaining a tooth profile using a prolate epitrochoid curve.
Figure 3:
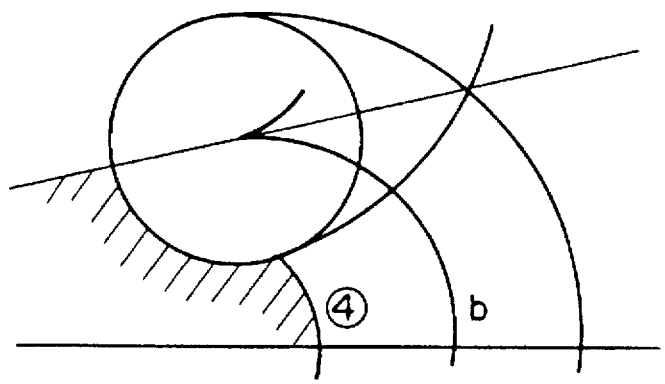
FIG. 3 is a diagram for explaining a tooth profile using an epicycloid curve.

In conventional standard products, tooth profile of type ① shown in FIG. 2 has been in use for such advantages as easy manufacture, high contact ratio, and possibility of largely decreasing a resultant force of load of an eccentric body bearing. Even at the present time, therefore, this type ① of tooth profile is a mainstream in the field of metallic gear device.

Figure 4:
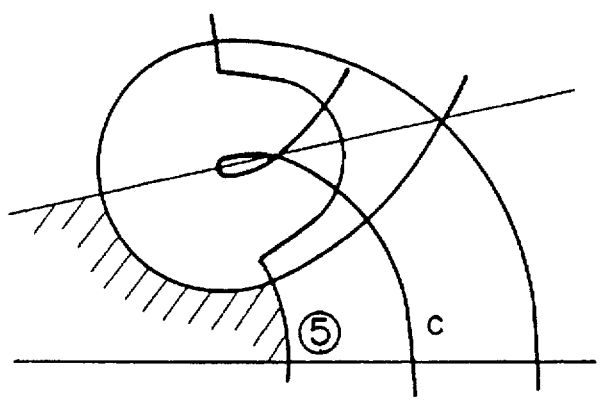
FIG. 4 is a diagram for explaining a tooth profile using a curtate epitrochoid curve.

On the other hand, the tooth profile of plastics gears of the present invention is a tooth profile corresponding to type ⑤ in FIG. 4, that is, the tooth profile including the curve of inner envelope of the curtate epitrochoid theoretical curve.

Hereinafter the internal planetary gear device of the present invention will be compared with a prior art.

Figure 9:
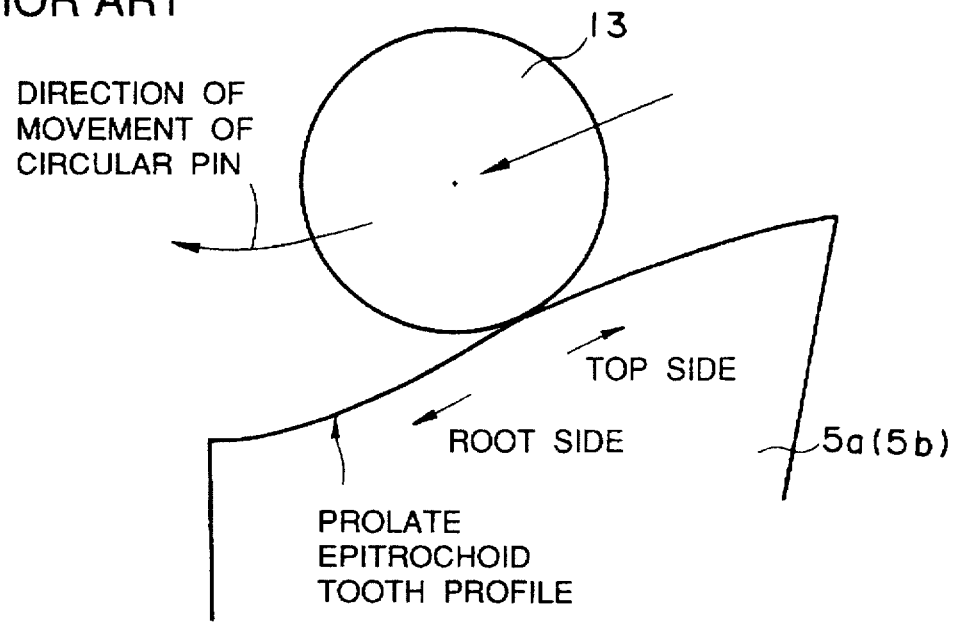
FIG. 9 is a partly enlarged view showing a prior art meshing gear device having prolate epitrochoid and convex circular tooth profiles.
Figure 10:
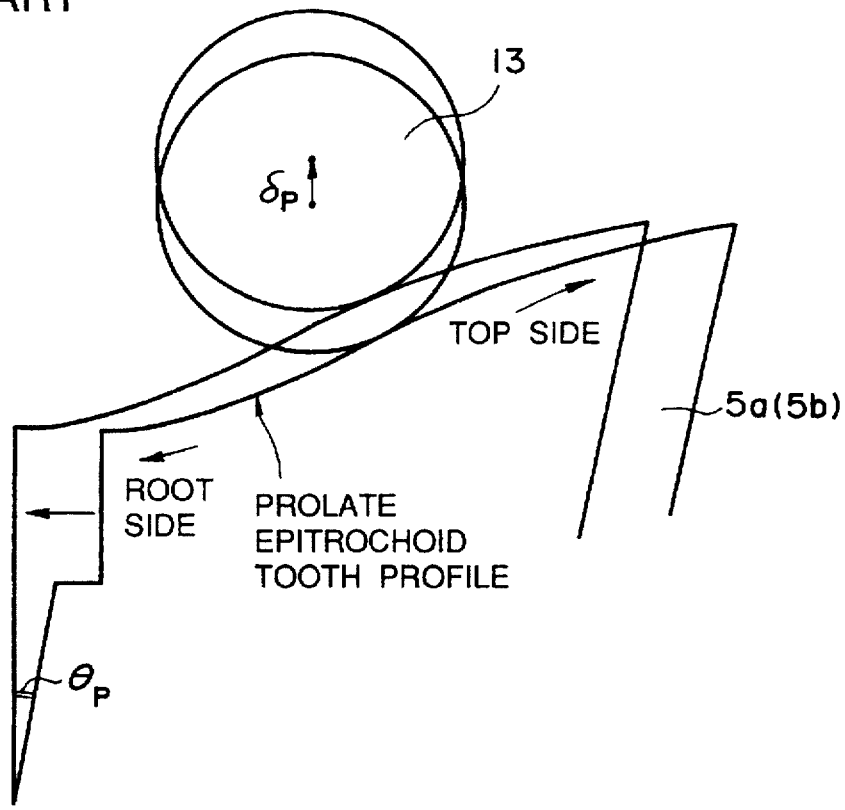
FIG. 10 is a partly enlarged view of a meshing portion showing an effect given to rotational uniformity by the error in the radial direction in the prior art meshing gear device having prolate epitrochoid and convex circular tooth profiles.
Figure 11:
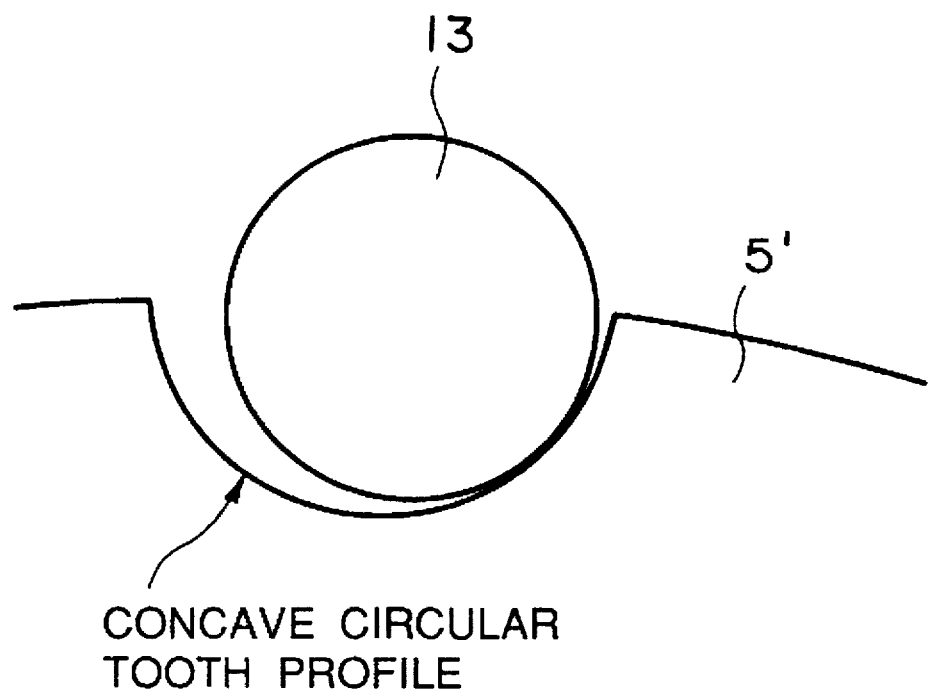
FIG. 11 is a partly enlarged view of a meshing portion showing a gear device in which prior art gears having simple circles of different diameters internally mesh with each other.

FIGS. 9 and 10 are enlarged views which, particularly noticing the effect of an error in the amount of eccentricity (an error in a radial direction), shows the engagement of the prior art external gear 5a (5b) of prolate epitrochoid tooth profile and the circular pin 13 (internal gear teeth of the internal gear 10: convex circular tooth profile).

As is clear from the drawings, the prolate epitrochoid tooth profile is concave at the root of gear teeth and varies to a convex as it goes to the top side. Especially if there exists an error (an error in the radial direction) δ p in the amount of eccentricity e owing to the elastic deformation of each part in the case where the external gear 5a (5b) is molded out of a material which has not so high rigidity such as plastics, then tooth engagement deviates towards the top side of the tooth face. Therefore, the external gear 5a (5b) and the circular pin 13 make convex-surface-contact with each other with a very great surface pressure, which is likely to shorten a life of the gear device.

Figure 5:
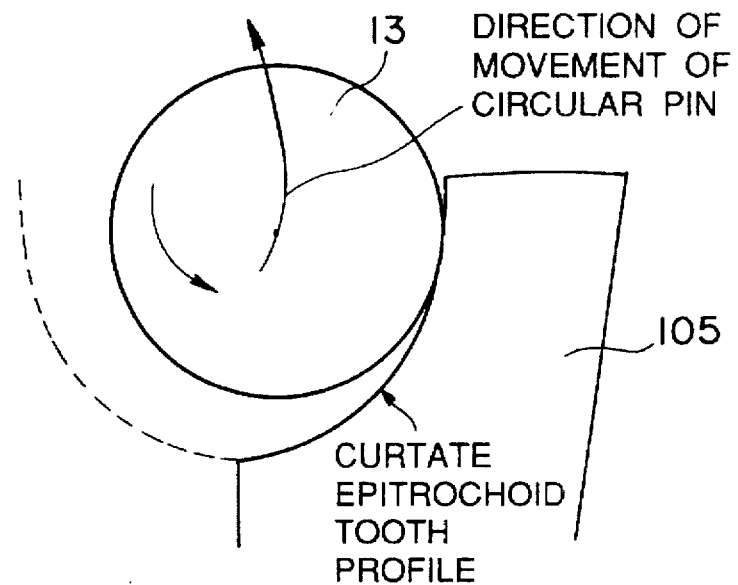
FIG. 5 is a diagram showing a meshing gear device having the curtate epitrochoid and convex circular tooth profiles.

On the other hand, in the case of engagement with an external gear 105 including the curtate epitrochoid tooth profile, gear engagement becomes a convex-to-concave surface-contact, and therefore it is possible to constantly maintain a very low surface pressure. Incidentally, in FIGS. 5 and 6, the broken line is on the back face side and will not contribute to gear engagement.

Figure 6:
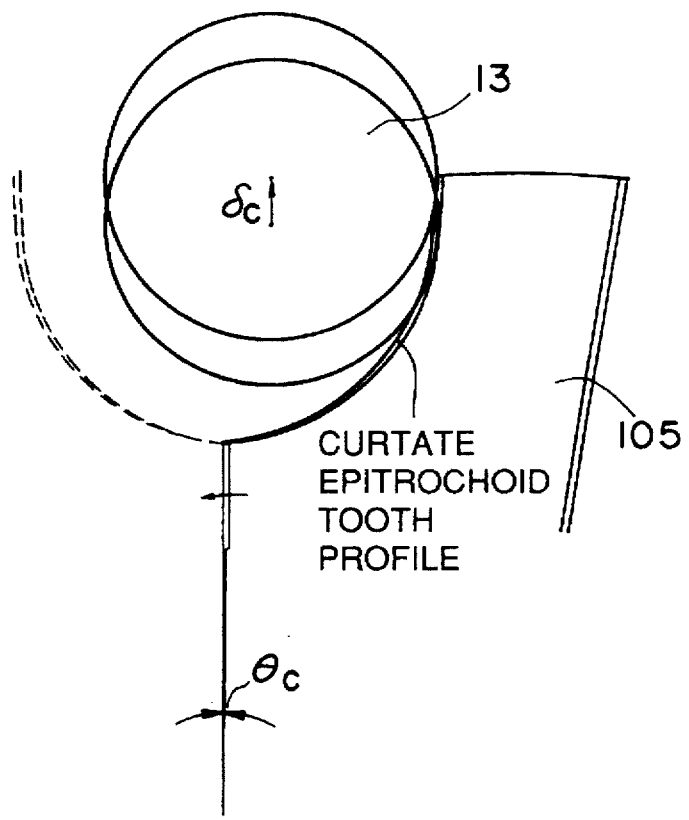
FIG. 6 is a partly enlarged view of a meshing portion, in the meshing gear device of the curtate epitrochoid and convex circular tooth profiles, showing an effect given by an error in a radial direction to rotational uniformity.

Also, in the case of the prior art prolate epitrochoid tooth profile in FIG. 10, as is clear from the comparison in FIGS. 6 and 10, the displacement δ p of the external gear 5a (5b) in a direction of rotation is large in relation to the error δ p in the radial direction because of a large tooth pressure angle. Concretely, this will appear in the nonuniform rotation.

On the contrary, as shown in FIG. 6, in the case of engagement with the external gear 105 including the curtate epitrochoid tooth profile, since the tooth pressure angle is small, the displacement θ c in the direction of rotation of the external gear 105 is extremely small with respect to the error δ c in the amount of eccentricity (an error in the radial direction) resulting from the elastic deformation of each part. This signifies that no (or little) rotational nonuniformity will occur even if there exists some error in the radial direction. It is very advantageous particularly in the case of a low-rigidity plastics internal planetary gear device.

Furthermore, in the case of the prior art tooth profile, the velocity of movement of the point of contact with the circular pin 13 is large on the top side because of the property of the prolate epitrochoid. Therefore when tooth engagement moves towards the top side due to the presence of the error δ p in the amount of eccentricity, noise and vibration tend to grow larger.

However, in the case of the curtate epitrochoid, because of slow velocity of movement of the point of contact with the circular pin 13, the gear having this tooth profile is also very advantageous with relation to noise and vibration (even if the error δ p exists).

In addition, since the external gear 105 and the circular pin 13, which are mounted in this type of internal planetary gear device, are in a relation close to a theoretical engagement as the internal and external gears, both can mesh with each other very smoothly.

In the above-described embodiment, taking facility of manufacture into consideration, the external gear 105 is manufactured with a tooth profile of the form of the inner envelope of the curtate trochoid theoretical curve, while the internal gear (circular pin 13) is manufactured with the convex circular tooth profile (cylindrical circular pin), however, these gears may be reversed in tooth profile.

Furthermore, in the present invention it is desired to manufacture the gears including all tooth profiles at once by a specific dies, for example through the injection molding process, making the most of the advantage that a resin is used as a material of the gears.

According to this method, once the die is prepared, a plurality of gears with any complicated tooth profile can be manufactured at a low cost because the gears can be generated completely similarly regardless of the type of tooth profile, that is, simple circles or theoretical curves.

What is claimed is:

1. An internal planetary gear device, which comprises a first shaft, an eccentric body mounted on said first shaft, an external gear eccentrically and rotatably mounted through the eccentric body, an internal gear internally meshing with said external gear, means for taking up only components of rotation of said external gear, and a second shaft connected to the external gear through the means for transmitting only components of rotation of the external gear; wherein said gear device is made of resin, and said internal gear is formed with a convex circular tooth profile, while said external gear is formed with a tooth profile including an inner envelope configuration of a curtate epitrochoid theoretical curve.

2. An internal planetary gear device, which comprises a first shaft, an eccentric body mounted on said first shaft, an external gear eccentrically and rotatably mounted through the eccentric body, an internal gear internally meshing with said external gear, means for taking up only components of rotation of said external gear, and a second shaft connected to the external gear through the means for transmitting only components of rotation of the external gear; wherein said gear device is made of resin, and said external gear is formed with a convex circular tooth profile, while said internal gear is formed with a tooth profile including an inner envelope configuration of a curtate epitrochoid theoretical curve.

3. An internal planetary gear device according to claim 1, wherein, at least said external gear having the tooth profile including said inner envelope configuration of the curtate epitrochoid theoretical curve is molded, together with the tooth profile, by an injection molding process.

4. An internal planetary gear device according to claim 2, wherein, at least said internal gear having the tooth profile including said inner envelope configuration of the curtate epitrochoid theoretical curve is molded, together with the tooth profile, by an injection molding process.

* * * * *